United States Patent [19]

Fujiwara et al.

[11] Patent Number: 6,064,879

[45] Date of Patent: *May 16, 2000

[54] MOBILE COMMUNICATION METHOD, AND MOBILE TELEPHONE SWITCHING STATION CUSTOMER MANAGEMENT SYSTEM, AND MOBILE UNIT FOR IMPLEMENTING THE SAME

[75] Inventors: Shuuji Fujiwara; Minoru Maruyama, both of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,704

[22] Filed: Jan. 3, 1997

Related U.S. Application Data

[63] Continuation of application No. 08/269,179, Jun. 30, 1994, abandoned.

[30] Foreign Application Priority Data

Jan. 10, 1994 [JP] Japan .................................. 6-000832

[51] Int. Cl.[7] ........................................................ H04Q 7/20
[52] U.S. Cl. ............................. 455/419; 455/551; 455/403
[58] Field of Search ..................................... 455/403, 405, 455/406, 408, 418, 419, 422, 550, 551, 565, 410, 411

[56] References Cited

U.S. PATENT DOCUMENTS

| | | |
|---|---|---|
| 4,864,599 | 9/1989 | Saegusa et al. ..................... 379/62 X |
| 4,958,368 | 9/1990 | Parker .................................. 379/58 X |
| 5,031,204 | 7/1991 | McKernan ............................... 379/63 |
| 5,077,790 | 12/1991 | D'Amico et al. ..................... 379/62 X |
| 5,297,191 | 3/1994 | Gerszberg ................................. 379/59 |
| 5,325,418 | 6/1994 | McGregor et al. ..................... 379/59 |
| 5,386,455 | 1/1995 | Cooper .................................. 379/58 |
| 5,386,468 | 1/1995 | Akiyama et al. ..................... 379/62 X |
| 5,420,908 | 5/1995 | Hodges et al. ......................... 455/411 |
| 5,465,288 | 11/1995 | Falvey et al. ....................... 455/419 X |
| 5,765,108 | 6/1998 | Martin et al. ........................ 455/422 |

FOREIGN PATENT DOCUMENTS 1240028 9/1989 Japan .

Primary Examiner—William G. Trost
Attorney, Agent, or Firm—Helfgott & Karas, P.C.

[57] ABSTRACT

A mobile communication method suitable for a purchased mobile unit system, a mobile telephone switching station, a customer management system, and a mobile unit. A temporary ID, with communication restrictions, such as a limitation on the number of calls, is written into a mobile unit along with a DN, prior to shipment of the mobile unit. After purchase, the mobile unit is operated to initiate a registration procedure via a mobile communication network by using the temporary ID and to have a permanent ID written therein. By using the temporary ID, a communication connection test can be conducted on the mobile unit prior to shipment from the factory. There is no need to install a ROM writer at a mobile unit shop to write personal information.

4 Claims, 20 Drawing Sheets

Fig.6

| MOBILE UNIT ID | DN | POSITION | ADDITIONAL SERVICE INFORMATION | TEMPORARY/ PERMANENT | NUMBER OF CALLS | BILLING INDEX |
|---|---|---|---|---|---|---|
| #0001 | 01234 | YOKOHAMA | —— | TEMPORARY | 10 | —— |
| #0002 | 56789 | TOKYO | —— | TEMPORARY | 0 | —— |
| #0003 | 98765 | CHIBA | ○○○○○○ | PERMANENT | —— | 123 |
| #0004 | 43210 | YOKOHAMA | ×××××× | PERMANENT | —— | 456 |
| ---- | ---- | ---- | ---- | ---- | ---- | ---- |

———— : HANDLED AS MEANINGLESS DATA

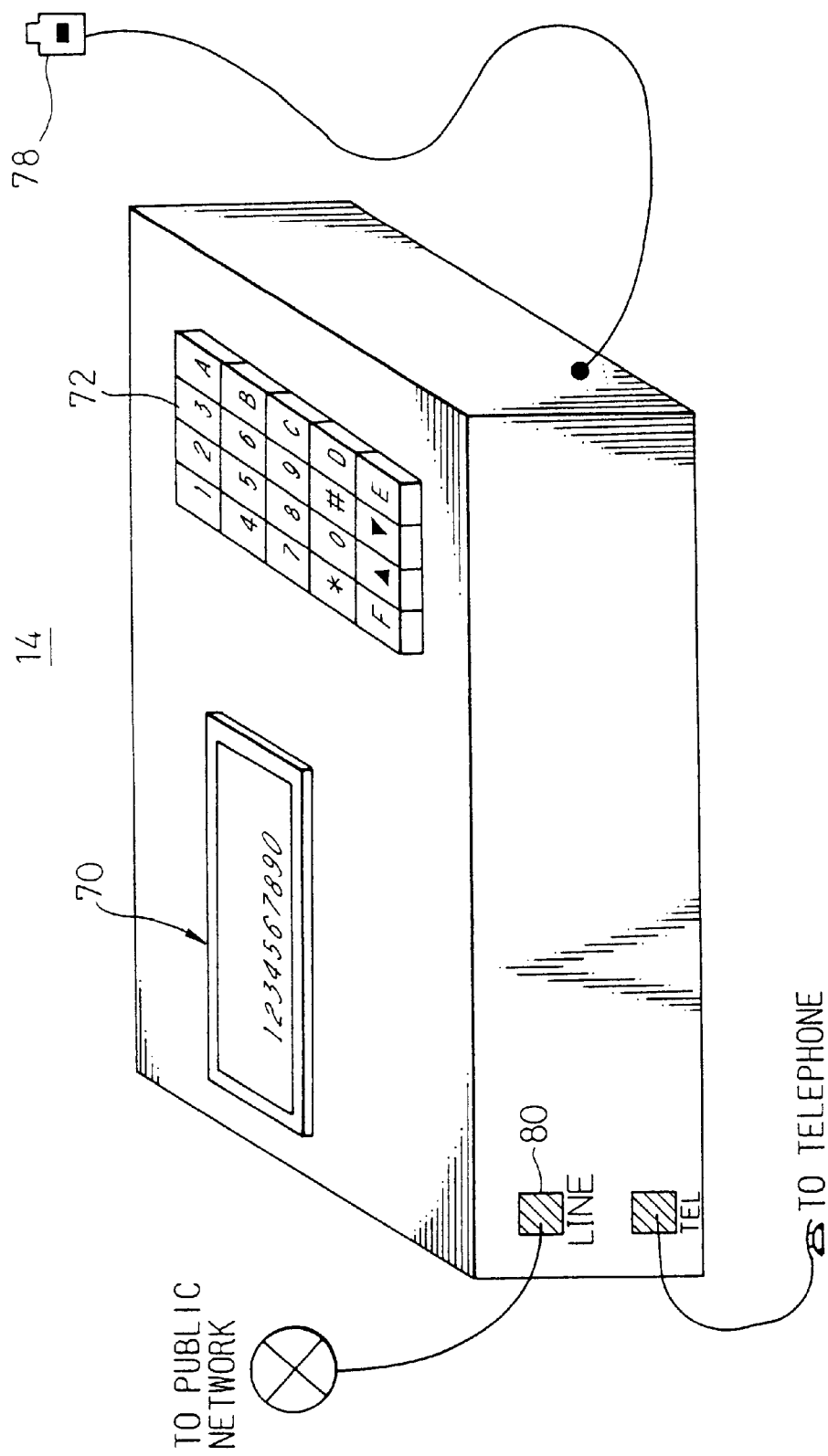

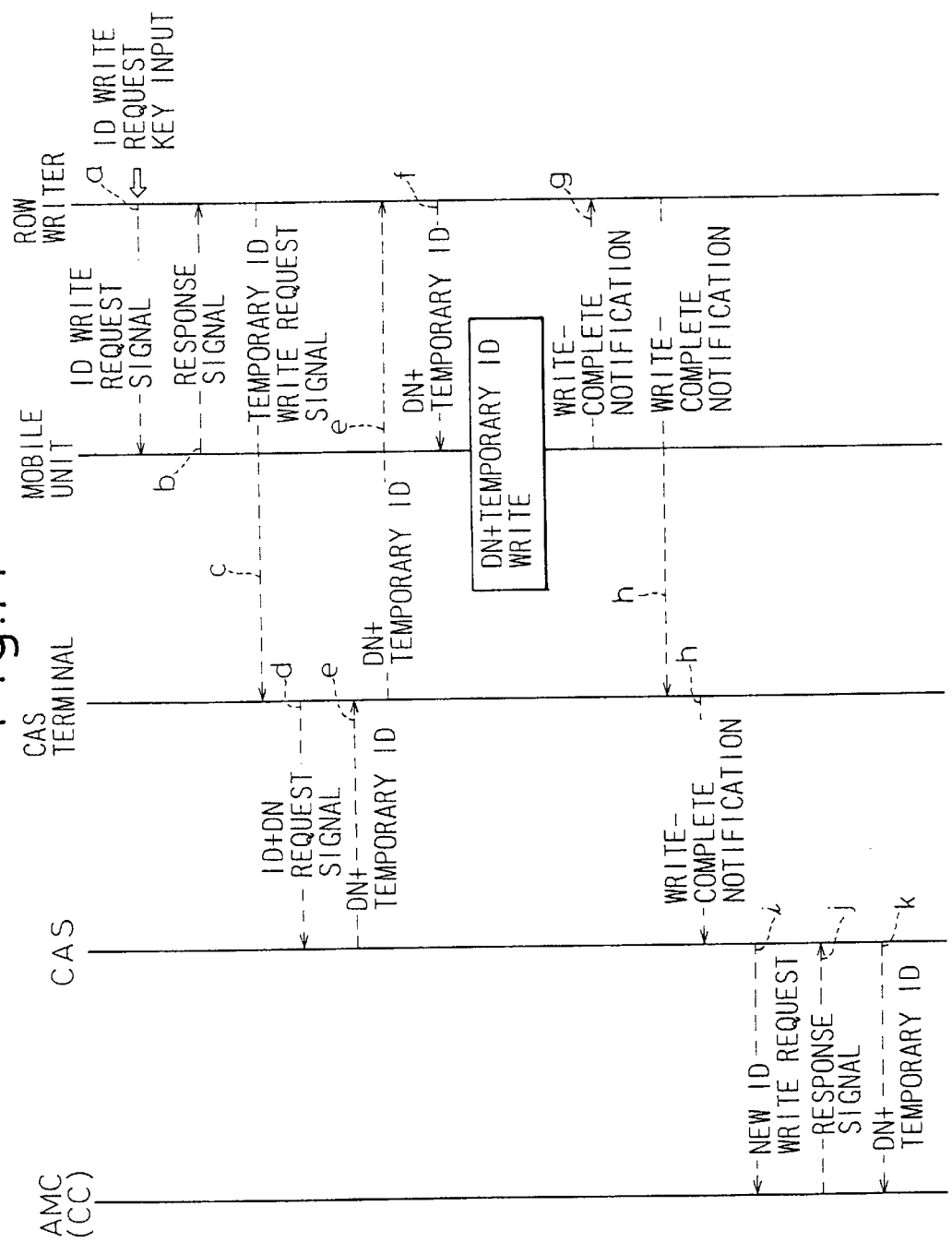

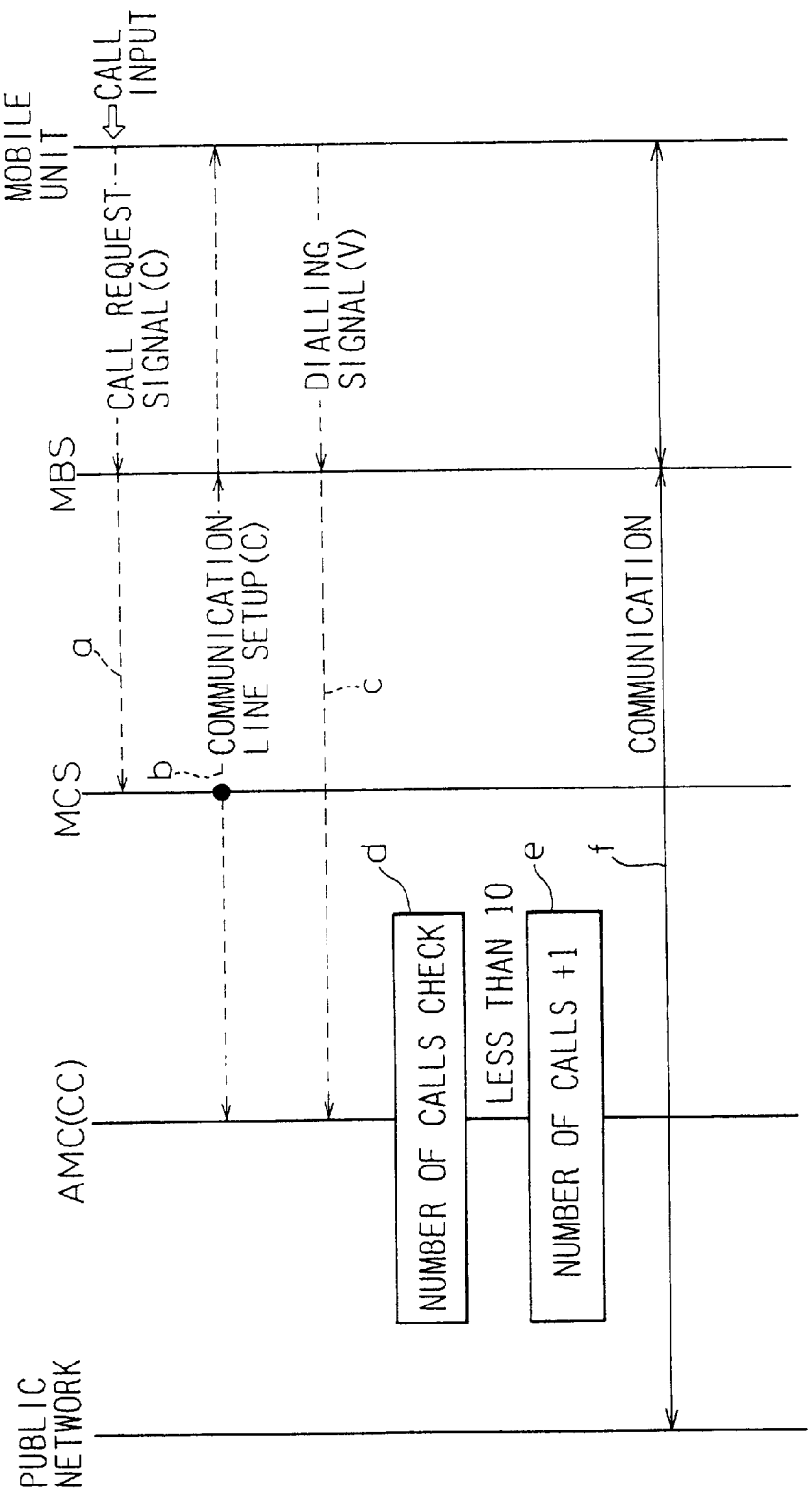

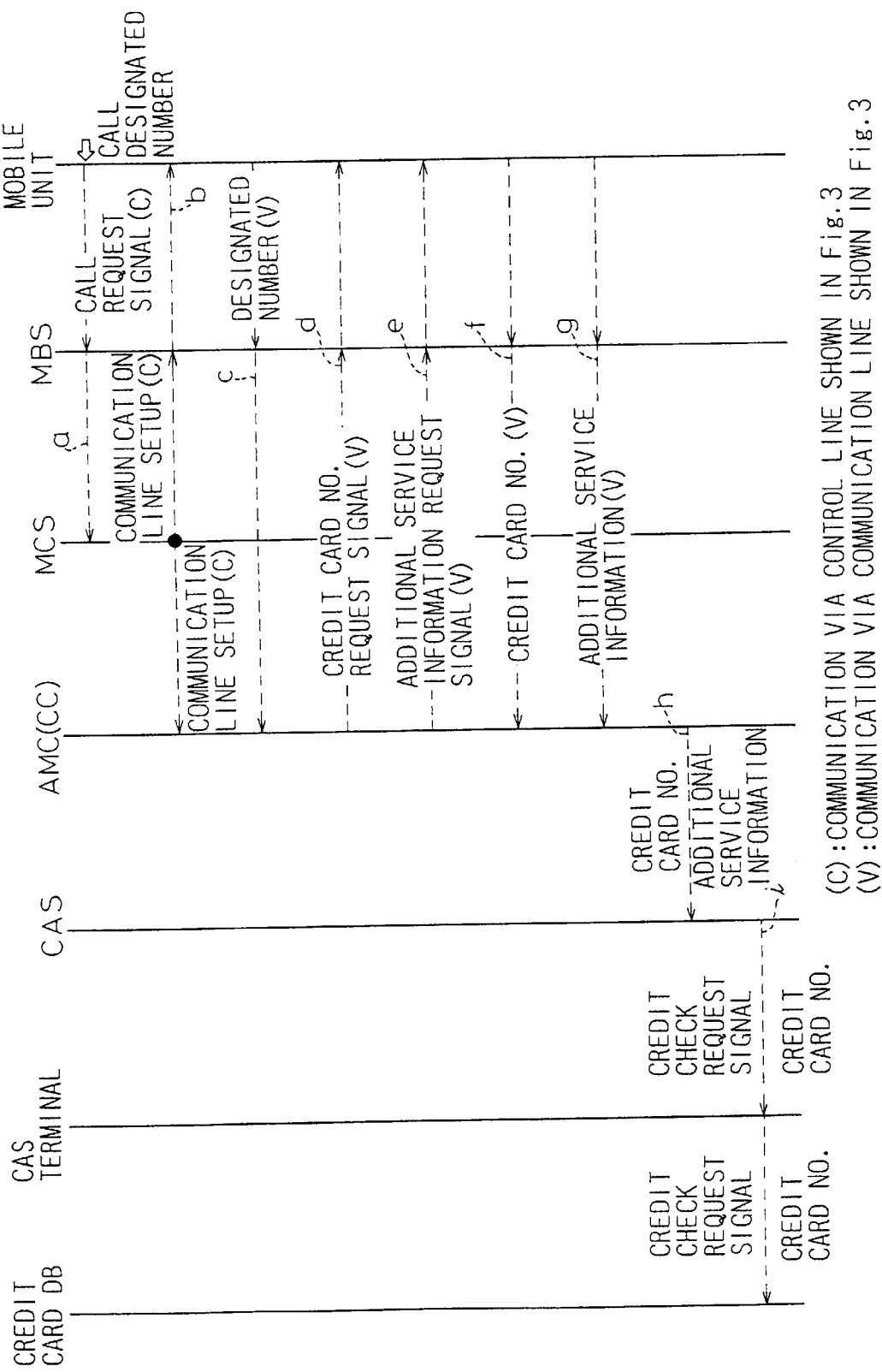

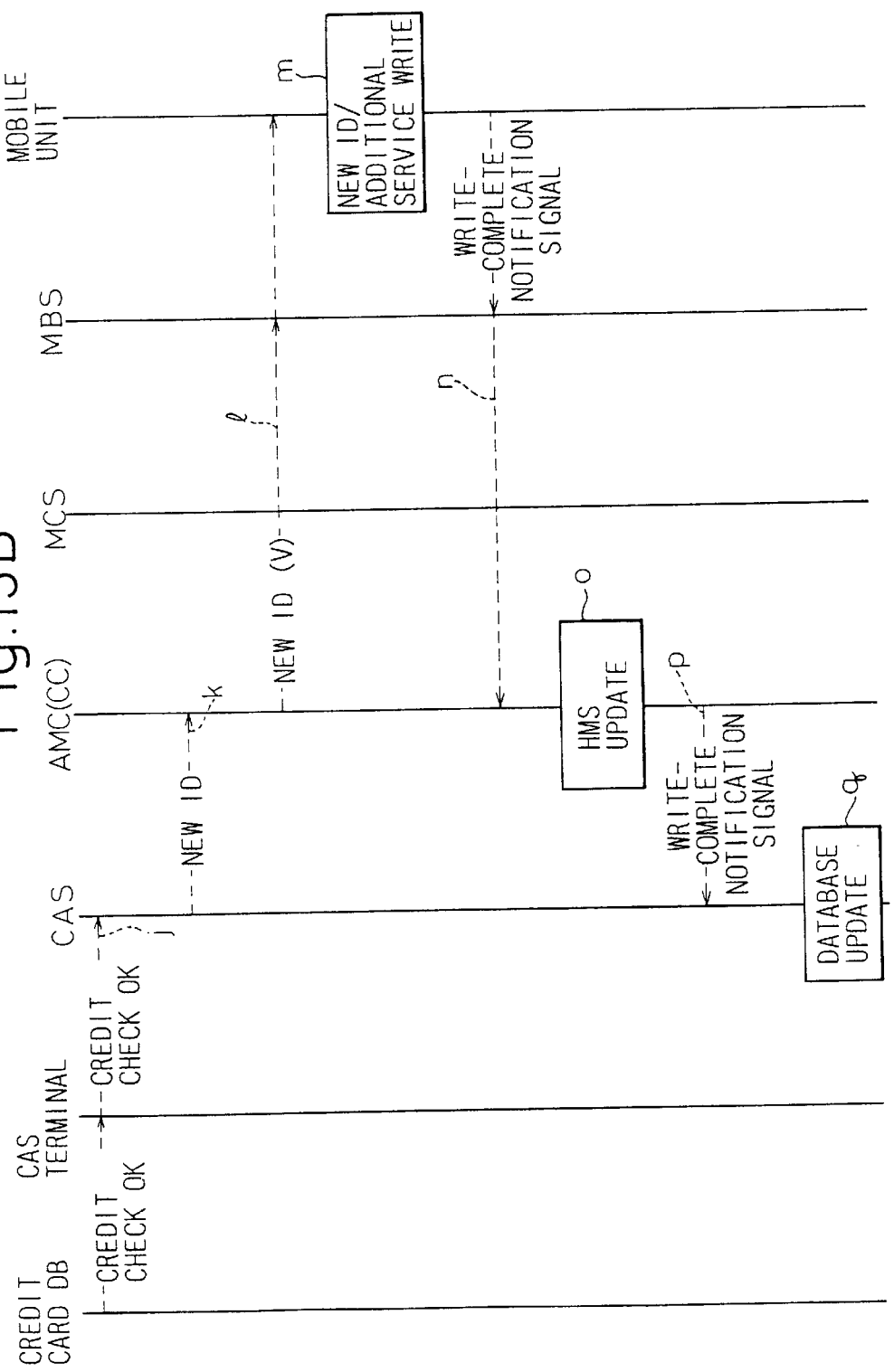

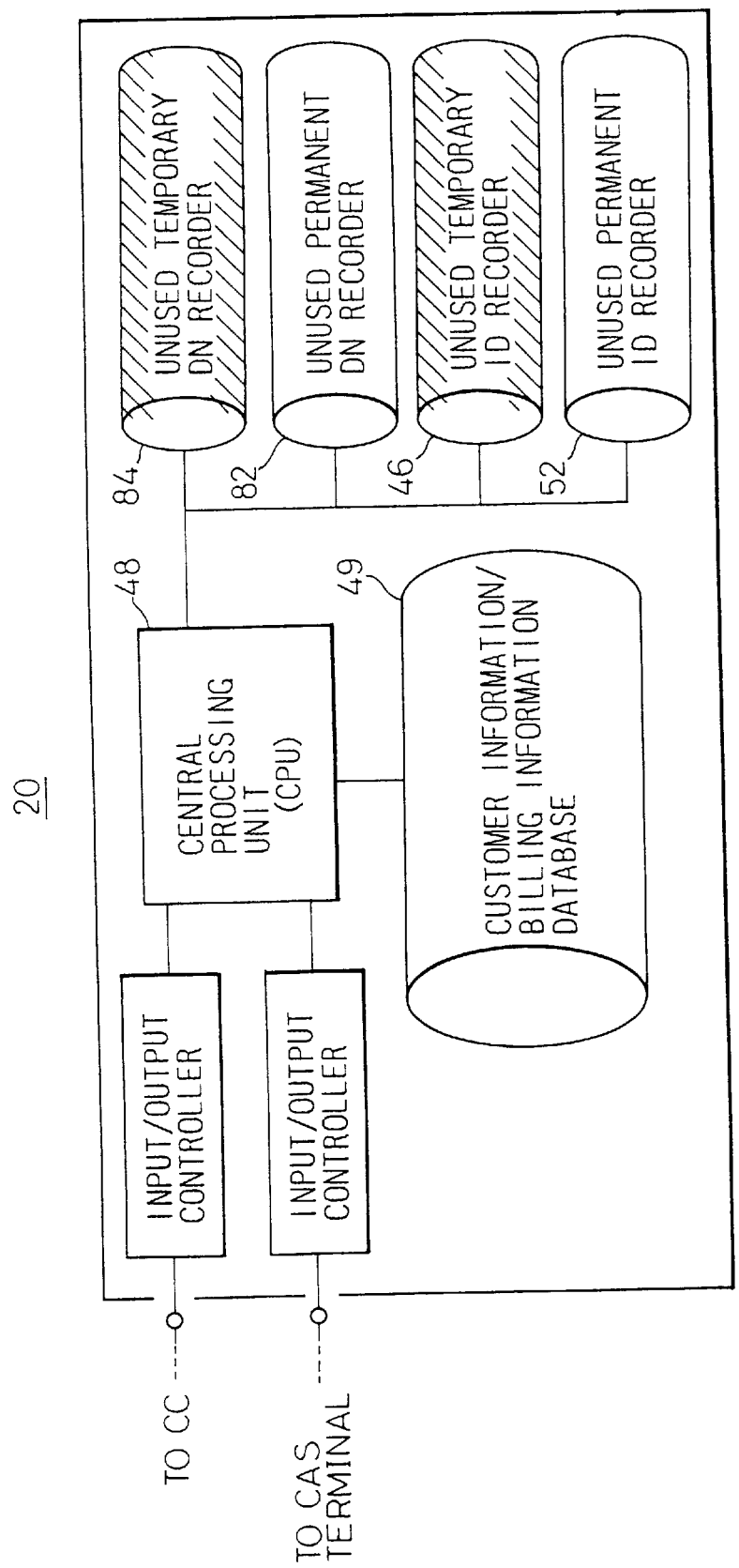

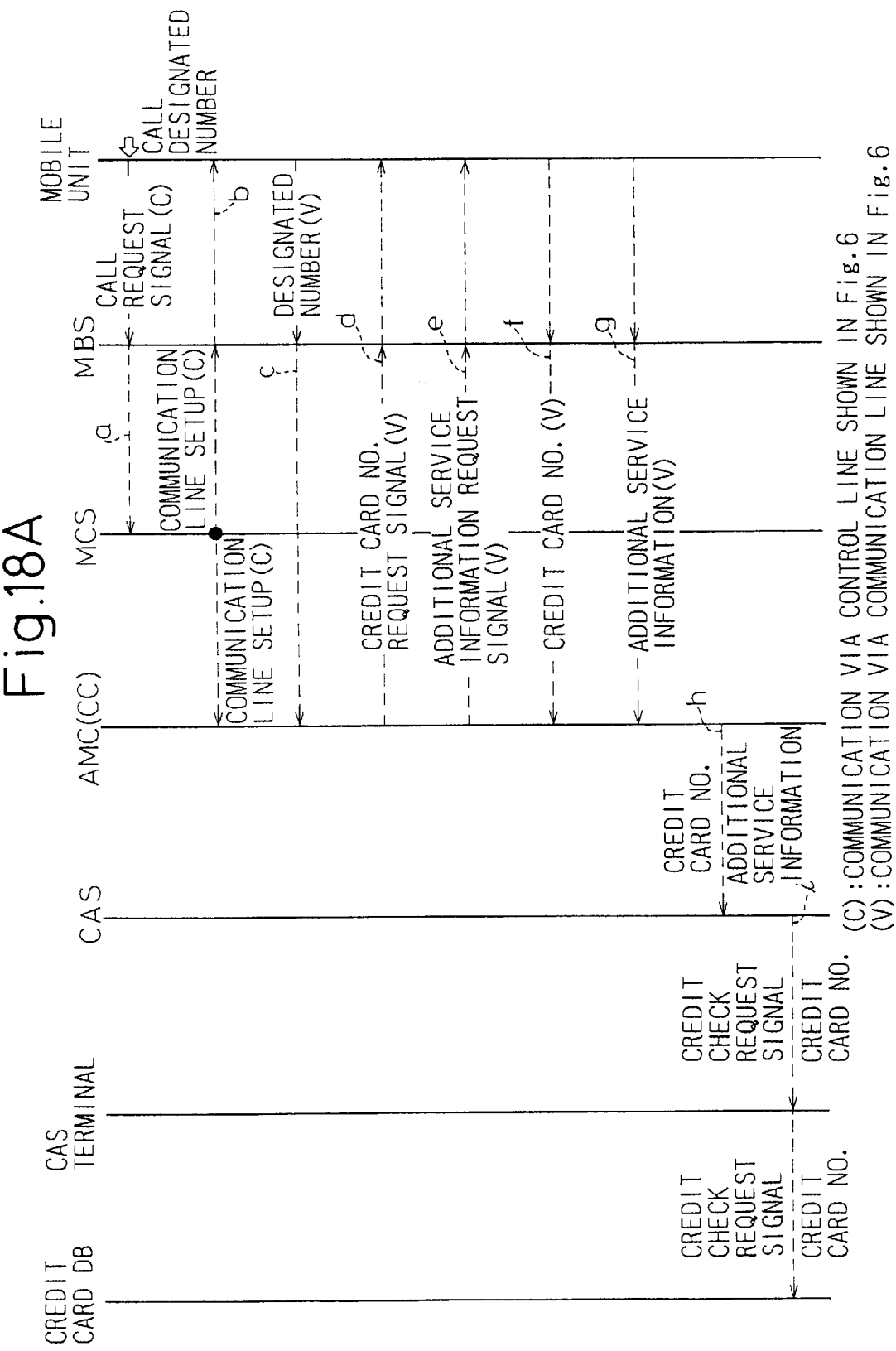

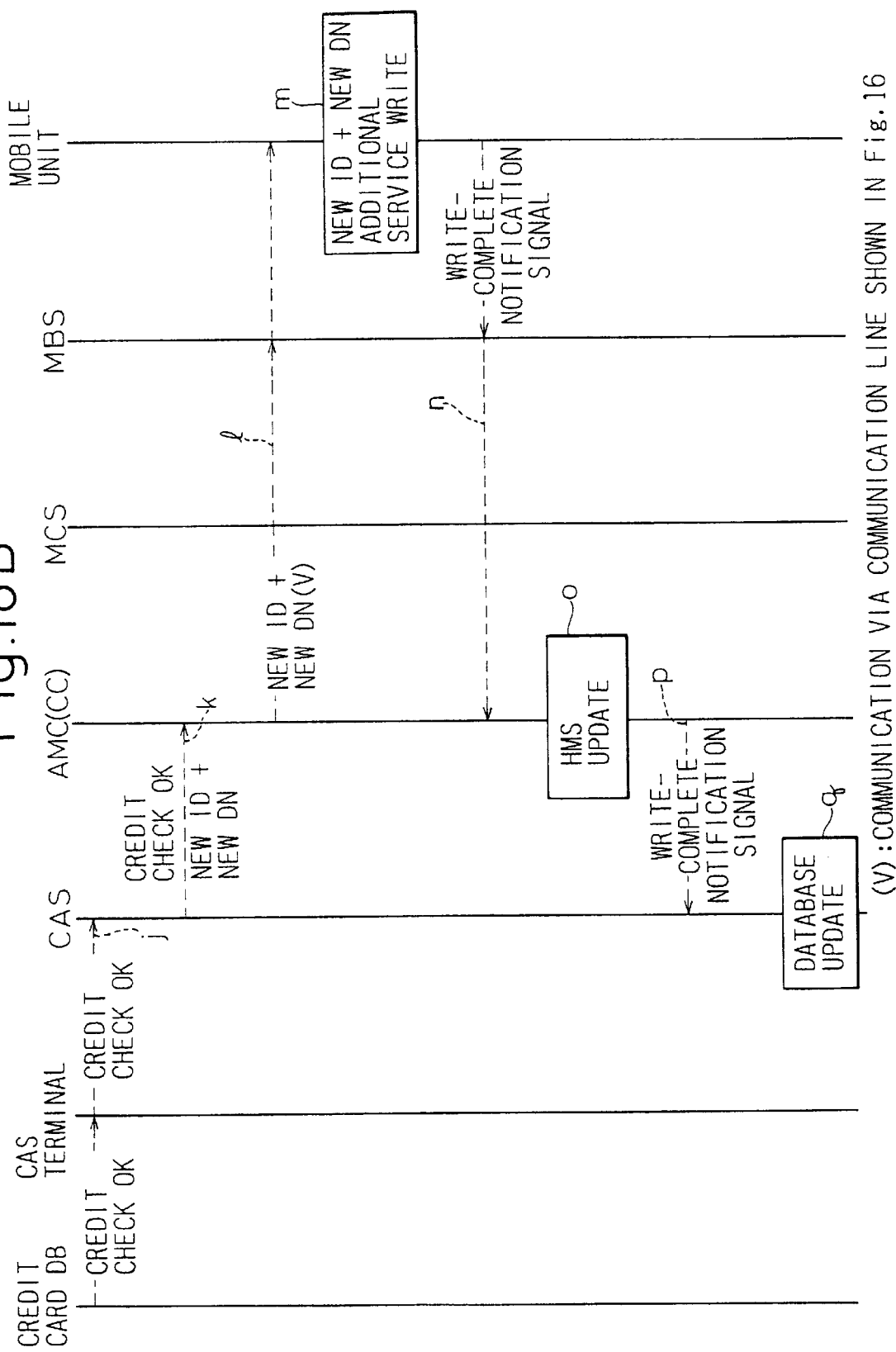

MOBILE COMMUNICATION METHOD, AND MOBILE TELEPHONE SWITCHING STATION CUSTOMER MANAGEMENT SYSTEM, AND MOBILE UNIT FOR IMPLEMENTING THE SAME

This is a continuation of application Ser. No. 08/269,179, filed Jun. 30, 1994, now abandoned.

BACKGROUND OF THE INVENTION

1. Field of the Invention

The present invention relates to a mobile communication method suitable for a purchased mobile unit system, and also relates to a mobile telephone switching station, a customer management system, and a mobile unit for implementing the same.

2. Description of the Related Art

For mobile units used as mobile telephones such as car telephones, portable telephones, etc., Japan currently adopts leasing systems under which subscribers lease mobile units from common carriers providing mobile telephone networks, but a purchased equipment system is expected to be introduced soon whereby the user can purchase a mobile unit. While it is hoped that the introduction of the purchase system will contribute to more widespread use of mobile telephones, it may give rise to problems such as illegal duplication of mobile units (clone mobile units). In fact, other countries where purchase systems are adopted are already facing such problems.

There are two types of information stored in the memory of a mobile unit: information such as built-in software, whose contents are identical with other mobile units of the same model, and information that is different for each individual mobile unit and is used to authenticate the mobile unit to the communication network for connection. The former type of information need not be read out or written in from the outside, and also, the amount of information is large; therefore, it is hard or impossible to read out or write in the information from the outside. On the other hand, the latter type of information includes information concerning the telephone number (Mobile Subscriber Number: MSN) assigned to each individual subscriber of the telephone network, the mobile unit number (Mobile Station Identity: MSI) for identifying each individual mobile unit, the authentication key (MSN-key) for the communication network to authenticate the subscriber, and the authentication key (MSI-key) for the communication network to authenticate the mobile unit. The amount of such personal information is relatively small. Once the mobile unit lump-sum purchase system is put into operation, it will become necessary that when a contract between the common carrier and the subscriber who purchased a mobile unit is made after the sale of the product, the personal information be written into the mobile unit for registration with the common carrier as soon as possible; to achieve this, provisions must be made so that such personal information can be readily written in and read out from the outside. Furthermore, the personal information must be alterable to allow for a possible future change in the contents of the contract.

In other countries where mobile unit purchase systems are already adopted, a stand-alone ROM writer is installed at a mobile unit shop, and each mobile unit, upon sale, is connected to the ROM writer to write the necessary personal information into an internal EEPROM of the mobile unit.

This method of writing personal information using a ROM writer, however, entails the problems described below.

(a) To make the mobile unit available to the subscriber for use when the contract is made, as many ROM writers as the number of mobile unit models carried or the number of common carriers contracted need to be installed at the mobile unit shop. This increases the sales cost.

(b) Because of human intervention when writing the personal information by using the ROM writer, there is a danger that the ID (identification information) may fall into the wrong hands.

(c) Since mobile units are shipped from factory with no personal information written therein, mobile units cannot be subjected to communication connection tests at the factory prior to shipment. (This means that there is a possibility that defective products may be delivered to users).

SUMMARY OF THE INVENTION

Accordingly, it is a first object of the invention to provide a mobile communication method that obviates the need to install a ROM writer for writing personal information at every mobile unit shop.

It is another object of the invention to provide a mobile communication method whereby personal information can be written into the mobile unit by simple operation.

It is a further object of the invention to provide a mobile communication method that reduces the risk of illegal use of personal information.

It is a still further object of the invention to provide a mobile communication method that permits communication connection tests to be conducted on mobile units at the factory prior to shipment.

It is yet another object of the invention to provide a mobile telephone switching station, a customer management system, and a mobile unit for implementing the above mobile communication methods.

According to the present invention, there is provided a mobile communication method comprising the steps of: registering temporary identification information, with communication restrictions imposed thereon, with a mobile communication network; storing the temporary identification information in a mobile unit; and selling the mobile unit with the temporary identification information stored therein.

According to the present invention, there is also provided a customer management system comprising: an unused temporary ID recorder for recording unused temporary identification information; means for transmitting, in response to a request from a mobile unit manufacturer, particular temporary identification information selected from among the temporary identification information stored in the unused temporary ID recorder, to the requesting mobile unit manufacturer; and means for notifying a mobile telephone switching station of the temporary identification information transmitted by the transmitting means.

According to the present invention, there is also provided a mobile unit comprising; an identification information storage for storing identification information; means for connecting to a customer management system via a mobile communication network by using the identification information stored in the identification information storage; and means for storing permanent identification information, received from the customer management system connected by the connecting means, into the identification information storage.

BRIEF DESCRIPTION OF THE DRAWINGS

FIG. 6 is a diagram showing the organization of the data stored in a home memory station (HMS);

FIG. 10 is a perspective view showing the external construction of the ROM writer;

FIG. 11 is a diagram illustrating a sequence for writing a DN and a temporary ID in the connection setup shown in FIG. 1;

FIG. 12 is a diagram illustrating a sequence for a communication test in the connection setup shown in FIG. 2;

FIG. 13A is a diagram illustrating the first half of a mobile unit registration sequence in the connection setup shown in FIG. 3;

FIG. 13B is a diagram illustrating the second half of the mobile unit registration sequence in the connection setup shown in FIG. 3;

FIG. 17 is a block diagram showing the configuration of a CAS according to the second embodiment of the invention;

FIG. 18A is a diagram illustrating the first half of a mobile unit registration sequence according to the second embodiment of the invention; and FIG. 18B is a diagram illustrating the second half of the mobile unit registration sequence according to the second embodiment of the invention.

DESCRIPTION OF THE PREFERRED EMBODIMENTS

Figure 1:
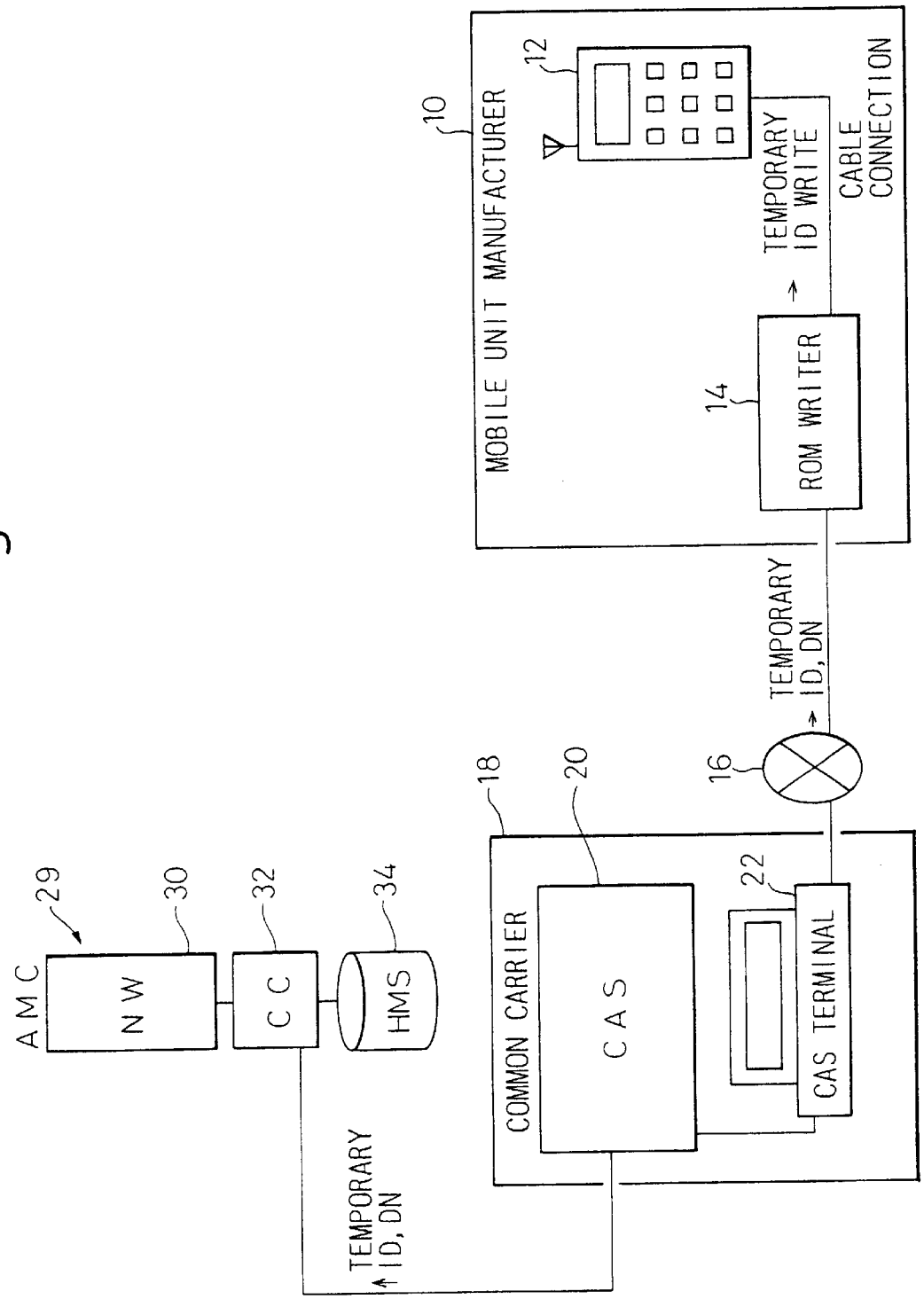
FIG. 1 is a block diagram showing in schematic form a connection setup used when writing a temporary ID according to a first embodiment of the invention.

FIG. 1 is a diagram showing in schematic form a connection setup, according to the present invention, that the mobile unit manufacturer uses when writing a telephone number (DN) and temporary identification information (ID) into a mobile unit at the factory. At the mobile unit manufacturer 10, as shown in FIG. 1, the completed mobile unit 12 is connected via a cable to a ROM writer 14 so that DN and temporary ID are written into the mobile unit 12. The ROM writer 14 in turn is connected, via a public network 16, to a CAS terminal 22 which is connected to a customer management system (CAS) 20 at a common carrier 18. The CAS 20 is connected to a central controller (CC) 32 at a mobile telephone switching station (AMC) 29.

In response to a request from the ROM writer 14, one of the unused DN/temporary ID pairs held in the CAS 20 is transmitted to the ROM writer 14 for writing into the mobile unit 12. The same DN/temporary ID pair is also sent to the CC 32 for registration at a home memory station (HMS) 34. The mobile unit 12 is now ready for connection to the mobile communication network, and can thus be subjected to a communication connection test.

Figure 2:
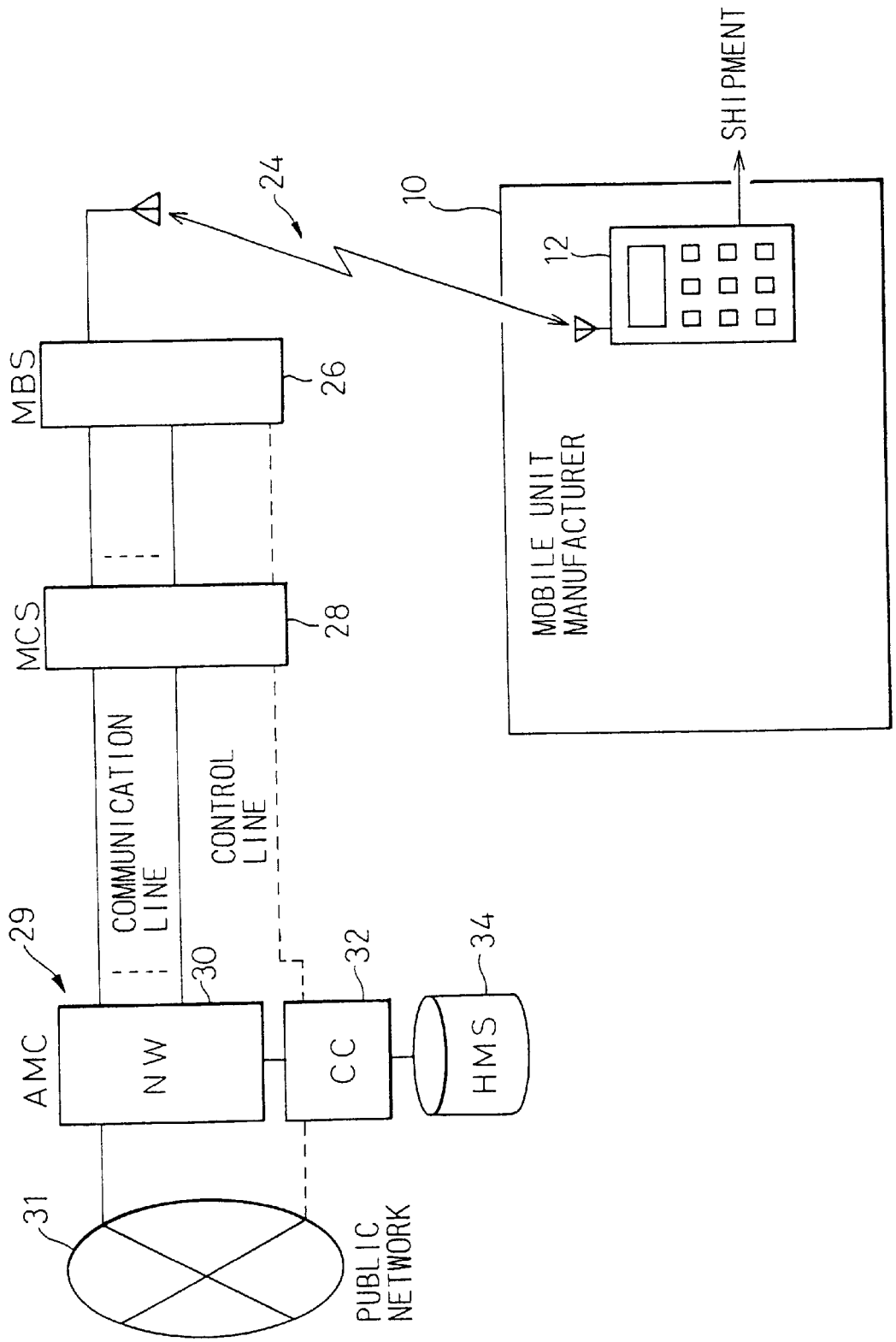
FIG. 2 is a diagram showing in schematic form a connection setup used when conducting a communication connection test according to the first embodiment of the invention.

FIG. 2 shows in schematic form a connection setup used when conducting a communication connection test by using a temporary ID. Since the same ID as the one written in the mobile unit 12 is stored in the HMS 34 at the AMC 29, a call initiated by the mobile unit 12 is transferred via a radio link 24, a mobile radio base station (MBS) 26, a mobile radio control station (MCS) 28, and a network (NW) 29, and connected to a public network 31. At this time, the AMC 29 identifies the ID of the mobile unit as a temporary ID and places restrictions on the communication that are not imposed in the case of a permanent ID. The communication restrictions include, for example, a limit on the number of calls that can be made, a limit on the call duration, and a restriction on communication data; one of these restrictions or a combination of two or more of these restrictions is imposed on the communication. If the use of the temporary ID is limited to the communication connection test at the factory, a limitation may be imposed on the call initiating area and/or call arrival area. The mobile unit 12 that has passed the communication connection test is sold with the DN and temporary ID written therein.

Figure 3:
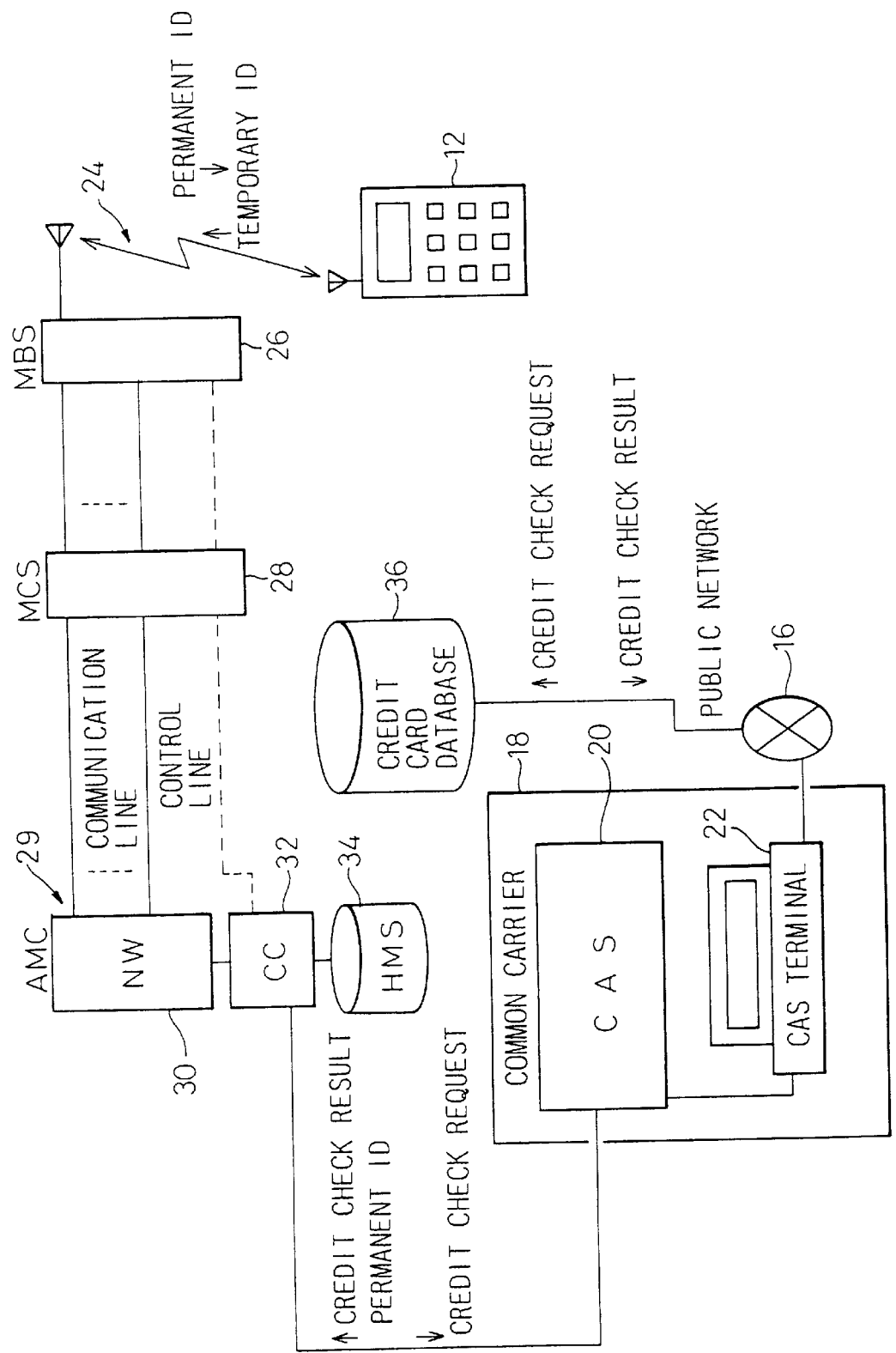
FIG. 3 is a diagram showing in schematic form a connection setup used when registering a mobile unit according to the first embodiment of the invention.

FIG. 3 shows in schematic form a connection setup for assigning a permanent ID to the mobile unit 12, after the sale thereof and thereby enabling communication free from the above restrictions. By dialing a designated DN from the mobile unit 12, the mobile unit 12 is connected to the CAS 20 at the common carrier 18 via the radio link 24, MBS 26, MCS 28, NW 30, and central controller (CC) 32. In response to the request from the mobile unit 12, the mobile unit 12 is registered with a permanent ID, and the permanent ID assigned to the registered mobile unit 12 is transmitted from the CAS 20 to the mobile unit 12 and written into the mobile unit 12, thus enabling communication free from the restrictions described above. If the use of the temporary ID is limited to the communication for mobile unit registration, the communication destination may be limited to a designated party and/or the communication data may be restricted to the commands necessary for the registration.

The home memory station (HMS) 34 connected to the CC 32 stores the ID information, position registration information, billing information, etc. for the mobile units registered with the mobile communication network. In addition to the usual functions as a CC, the CC 32 carries out the function of identifying specific IDs stored in the HMS 34 as temporary IDs and imposing the above-stated restrictions. The CAS 20 is also connected, via the CAS terminal 22 and public network 16, to a credit card company's database 36 for automatic online credit checks on registering applicants. In addition to the software for performing the usual functions as a mobile unit, software for receiving a permanent ID via a radio link and storing it is built into the mobile unit 12.

Figure 4:
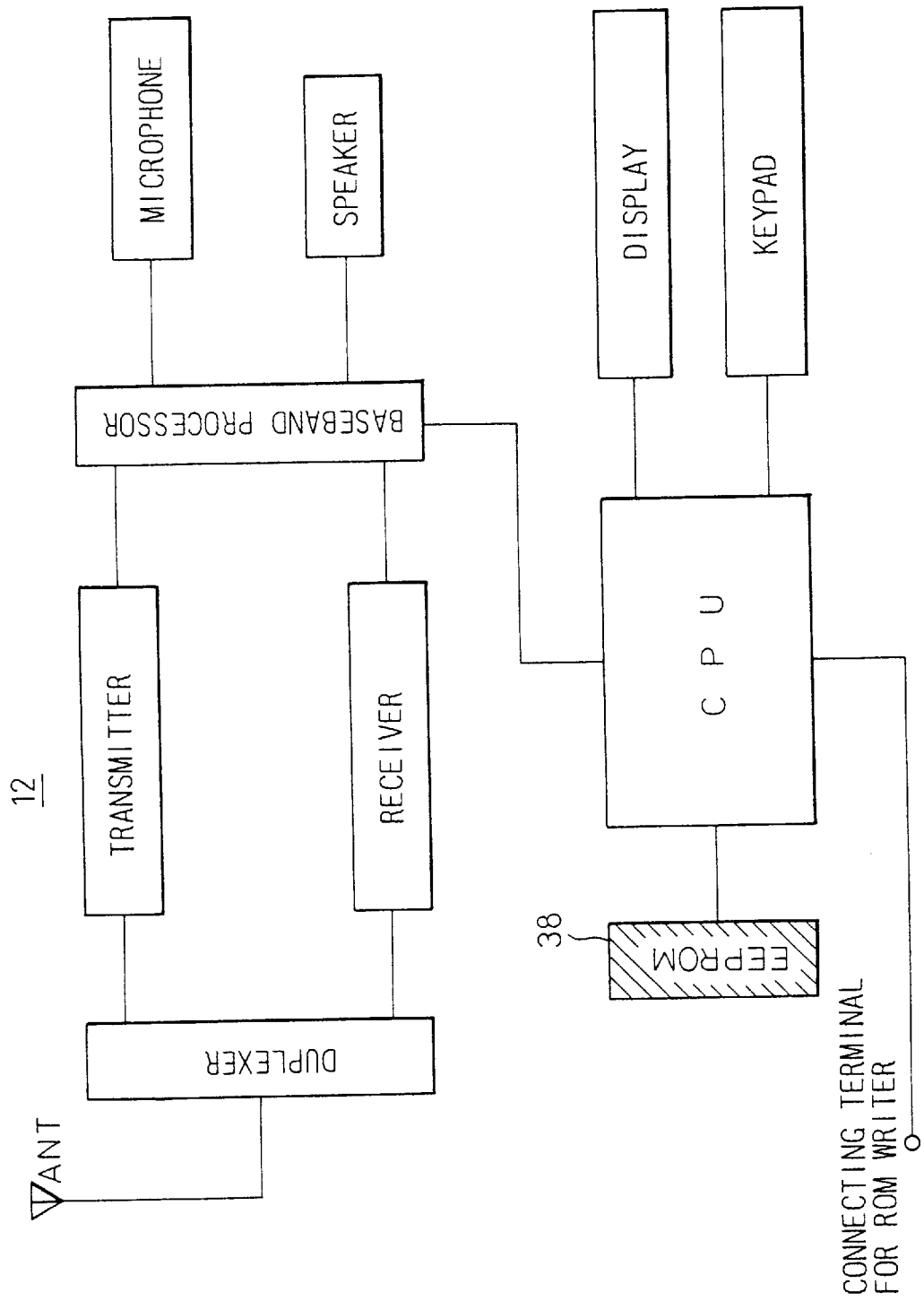
FIG. 4 is a block diagram showing the configuration of the mobile unit.

FIG. 4 shows the configuration of the mobile unit 12. The mobile unit configuration shown in FIG. 4 is identical to that of a conventional mobile unit into which a DN and an ID are written offline by using a ROM writer, except for the contents of an EEPROM 38 indicated by oblique hatching in the figure.

Figure 5:
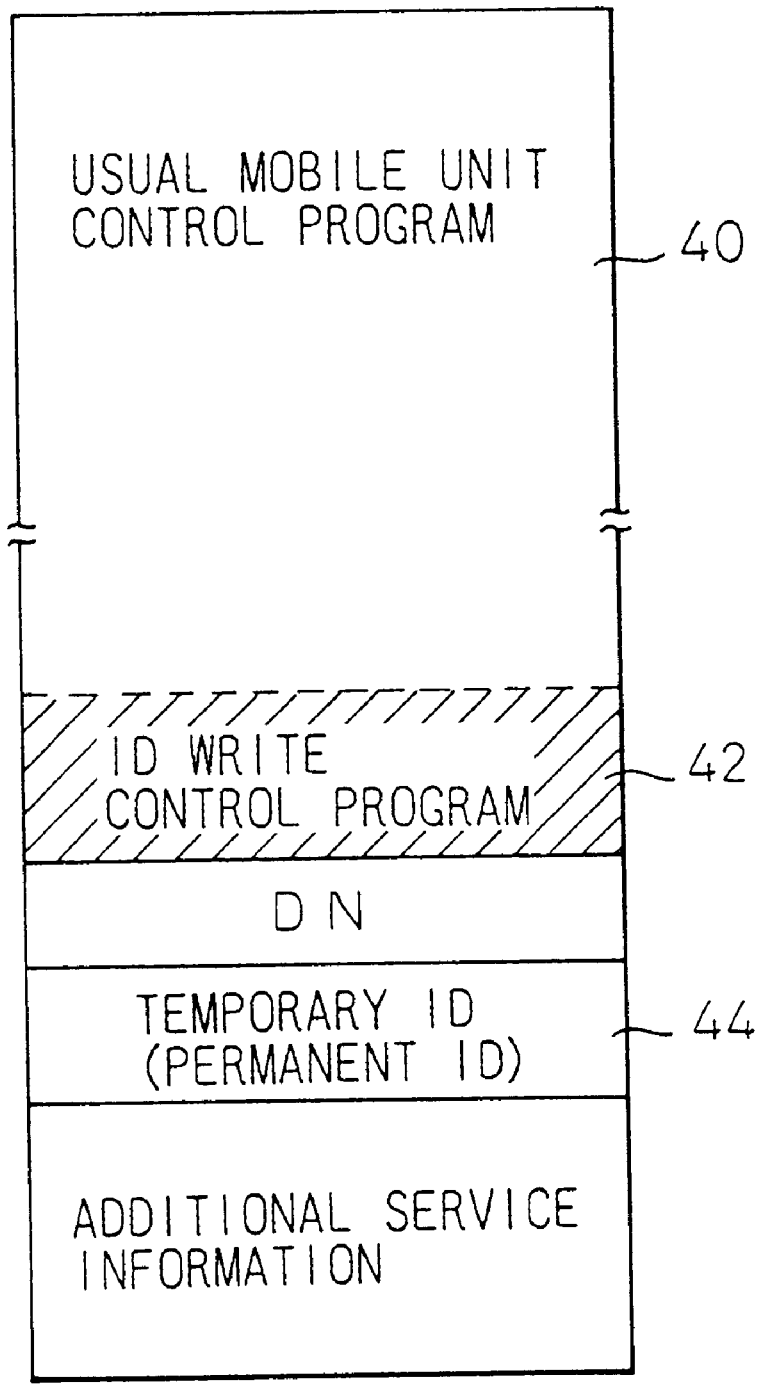
FIG. 5 is a diagram schematically showing the contents of an EEPROM of the mobile unit according to the first embodiment of the invention.

FIG. 5 shows in schematic form the contents of the EEPROM 38 shown in FIG. 4. In addition to a control program 40 for the usual mobile unit control operations, the EEPROM 38 contains a control program 42, stored in the shaded area shown, for writing a permanent ID using the mobile unit communication network described with reference to FIG. 3. As shown in FIG. 5, the temporary ID and the permanent ID are not stored in different locations, but the permanent ID is written into the same area 44 that stores the temporary ID; the temporary ID is replaced by the permanent ID when the latter is written in. The mobile unit does not discriminate between temporary ID and permanent ID.

The above structure also allows the use of a conventional offline ROM writer to write the permanent ID. As a result, service differentiation can be provided when a mobile unit of a certain type is designed for use with a plurality of mobile communication networks provided by different common carriers; that is, the simple registration procedure using a mobile communication network, according to the present invention, can be employed for a particular common carrier, while for the other common carriers, only the conventional registration procedure using a ROM writer can be used. Furthermore, as will be described in detail later, then changing the contract to add additional services in future, the change can be made through the mobile communication network by using the control program 42 for new registration.

FIG. 6 is a diagram showing the organization of the data stored in the HMS 34 shown in FIGS. 1 to 3. As in a conventional mobile communication system, the telephone number, the position of the mobile unit, additional service information, and billing index are stored for each of the mobile units #0001, #0002, . . . , registered with the communication network. The additional service information is data that indicates whether any additional service, such as a call-waiting service, is subscribed to. The HMS 34 of the present invention also stores data (temporary/permanent) that indicates whether the ID assigned to the mobile unit is a temporary ID or a permanent ID, whether communication restrictions are imposed on the mobile unit in the case of a temporary ID, and number-of-calls data that is used to check the number of calls when the communication restrictions involves a limitation on the number of calls. For mobile units whose ID is temporary, the additional service information and the billing index data are handled as meaningless data; for mobile units whose ID is permanent, the number-of-calls data is handled as meaningless data. Also, provisions may be made in the CC 32 so that the line will not be connected to a mobile unit with a temporary ID if there is a call connect request to such a mobile unit.

Figure 7:
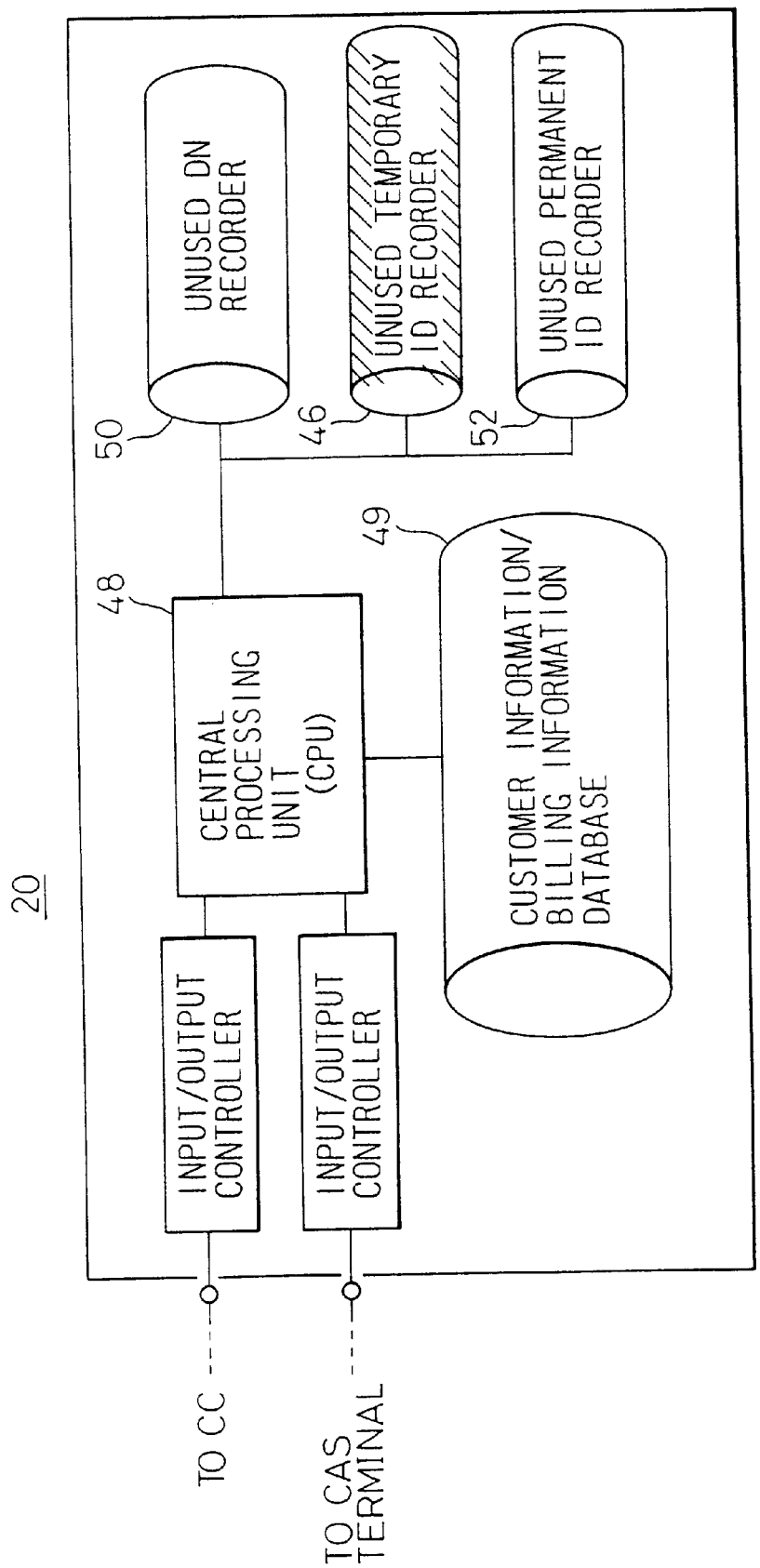
FIG. 7 is a block diagram showing the configuration of a customer management system (CAS) according to the first embodiment of the invention.

FIG. 7 is a block diagram showing the configuration of the CAS 20 according to the present invention. The CAS 20 of the present invention comprises, in addition to the usual component elements of a CAS, an unused temporary ID recorder 46 for recording unused temporary IDs. The CAS 20 of the present invention further includes control programs for a central processing unit (CPU) 48: that is, a control program for performing control in the temporary ID write operation described in FIG. 1 so that an unused DN and an unused temporary ID are extracted from the unused DN recorder 50 and unused temporary ID recorder 46 in response to a request from the CAS terminal 22, for transmission to the CAS terminal 22 and the CC 32; and a control program for performing control in the permanent ID registration operation described in FIG. 3 so that an online credit check is performed using the credit card data base 36 in response to a request from the CC 32, and if the result is OK, an unused permanent ID is extracted from an unused permanent ID recorder 52 for transmission to the CC 32.

Figure 8:
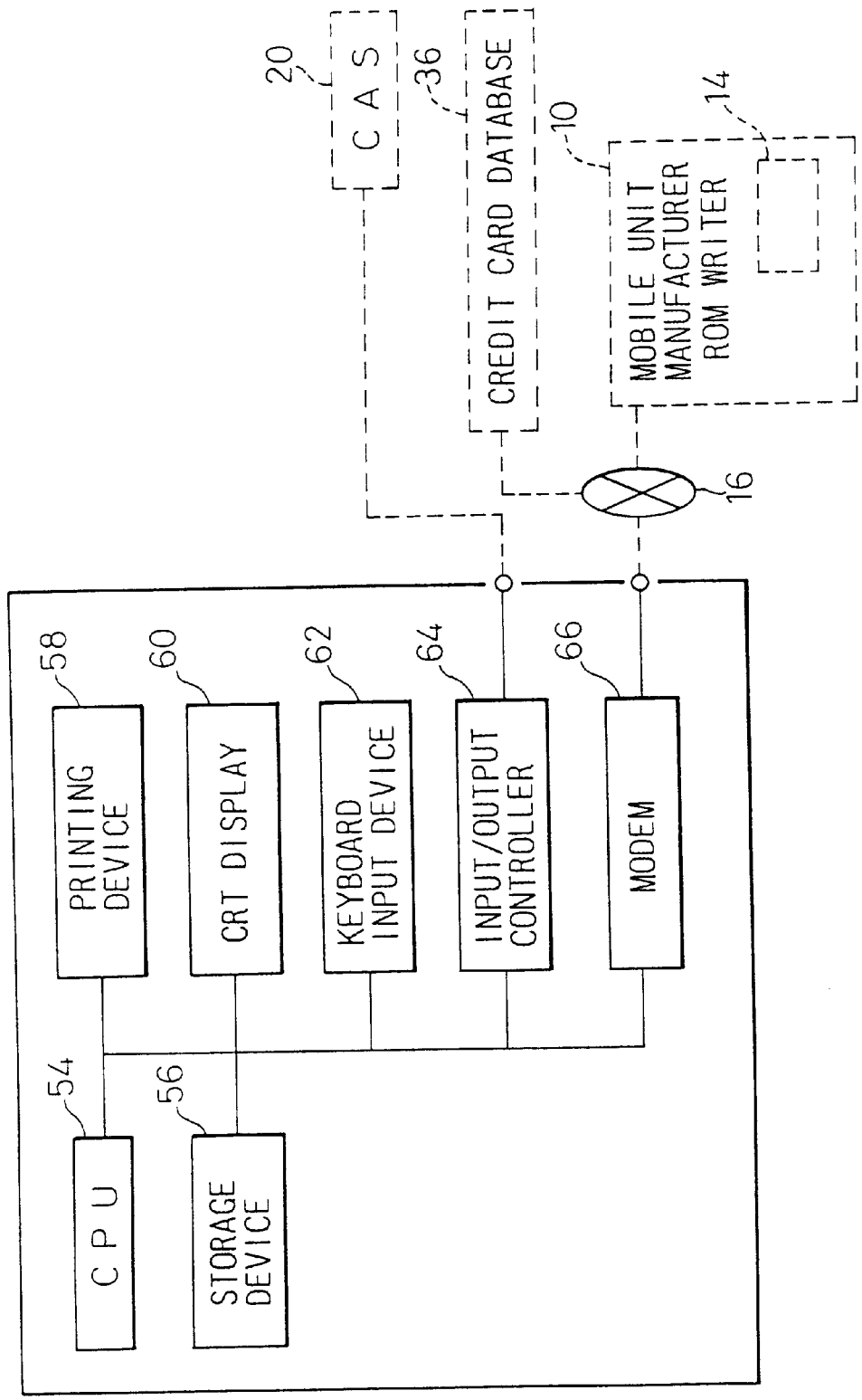
FIG. 8 is a block diagram showing the configuration of a CAS terminal.

FIG. 8 is a block diagram showing the configuration of the CAS terminal 22, The CAS terminal 22 of the present invention comprises: a CPU 54 for controlling mobile unit ID management, subscriber information management, etc. and also for controlling ID write operations; a storage device 56 for storing data under the direction of the CPU; a printing device 58 such as a printer; a CRT display 60 for presenting a visual representation of CAS terminal operations, etc. to the operator; a keyboard input device 62 via which the operator enters data and commands; an input/output controller 64 for controlling an input/output interface with the CAS 20; and a modem 66 used for data input to and output from the credit card database 36 and the ROM writer 14 at the mobile unit manufacturer 10.

Figure 9:
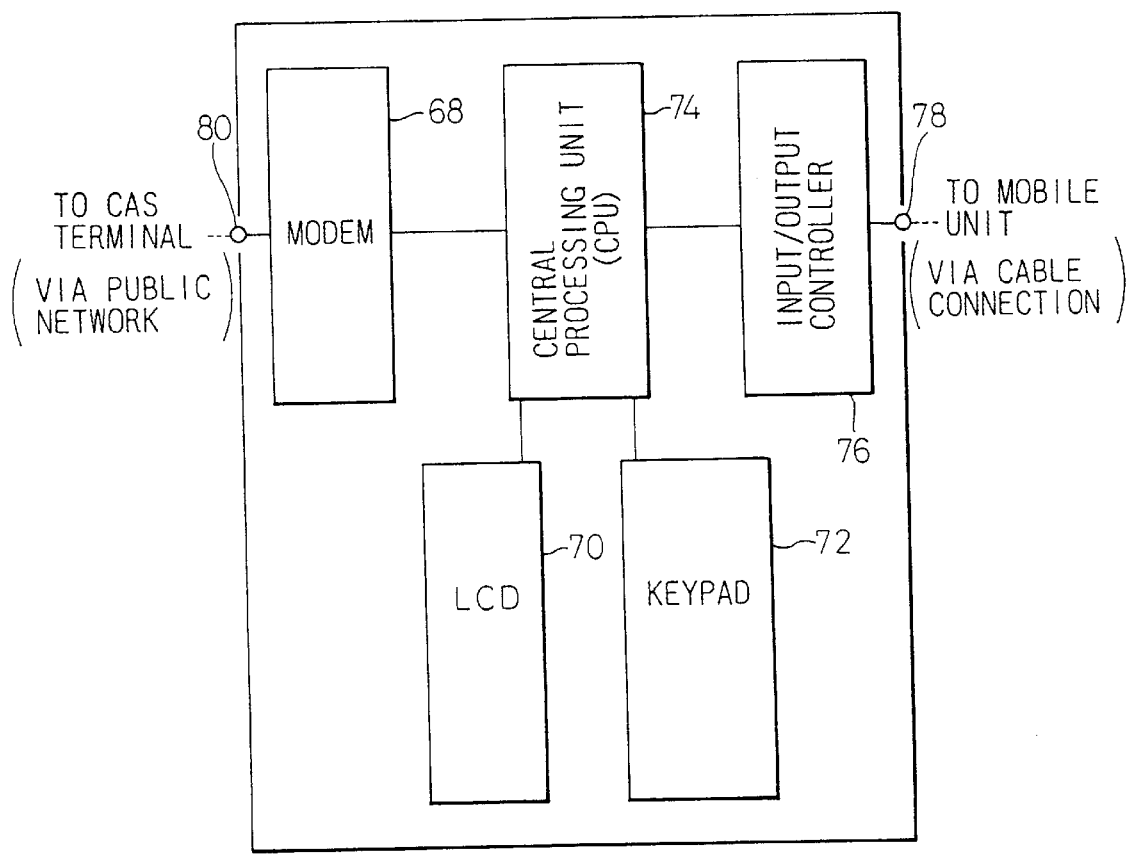
FIG. 9 is a block diagram showing the configuration of a ROM writer.

FIG. 9 is a block diagram showing the configuration of the ROM writer 14 according to the present invention. The ROM writer 14 of the present invention comprises, in addition to the usual component elements as a ROM writer, a modem 68 for connecting to the CAS terminal 22 via the public network 16, and a control program for receiving a DN and a temporary ID from the CAS terminal 22 and writing them into the mobile unit. FIG. 10 is a perspective view showing the external construction of the ROM writer.

FIG. 11 shows a sequence for writing a DN and a temporary ID in the connection setup of FIG. 1. When an ID write command is entered using the keypad of the ROM writer 14, an ID write request signal is sent to the mobile unit 12 (step a). When a response signal is returned from the mobile unit 12 (step b), a temporary ID write request signal is sent to the CAS terminal 22 (step c). In response, the CAS terminal 22 sends a signal to the CAS 22, requesting an unused temporary ID and an unused DN (step d). The CAS 20 extracts an temporary ID and a DN from the unused temporary ID recorder 46 and unused DN recorder 50 (FIG. 7), respectively, and sends the extracted pair to the ROM writer 14 (step e). When the temporary ID and the DN are received, the ROM writer 14 writes them into the mobile unit 12 (step f), and when a write-complete notification is received (step g), notifies the CAS 20 of the write completion (step h). The CAS 20 sends a new ID write request to the CC 32 (step i) and when a response signal is received (step J), the CAS 20 sends to the CC 32 the same DN and temporary ID as the ones sent to the ROM writer 14 (step k), and the CC 32 stores them into the HMS 34.

FIG. 12 shows a sequence for a communication test in the connection setup shown in FIG. 2. When a call operation is initiated by the mobile unit 12, a call request signal is sent to the MCS 28 via a control line (step a). In response, the MCS 28 sets up a communication line by using the control line, thus establishing a connection for communication from the mobile unit 12 to the AMC 29 (step b). Using the thus established communication line, a dialling signal is sent from the mobile unit 12 to the AMC 29 (step c). The AMC 29 checks the number of calls stored in the HMS 34 (step d); when the number is less than a predetermined number, then the AMC 29 increments the number of calls (step e), and establishes a connection for communication from the mobile unit 12 to the public network 31 (step f).

FIGS. 13A and 13B show a sequence for official registration of a mobile unit in the connection setup shown in FIG. 3: FIG. 13A shows the first half of the sequence and FIG. 13B the second half.

In FIG. 13A, when a call operation is initiated by the mobile unit 12 by entering a designated telephone number, a call request signal is sent from the mobile unit 12 to the MCS 28 via the control line (step a). As an example of the designated number, the its own DN may be entered. In response, the MCS 28 sets up a communication line by using the control line, thus establishing a connection for communication from the mobile unit 12 to the AMC 29 (step b). Using the thus established communication line, the designated telephone number is transmitted from the mobile unit 12 to the AMC 29 (step c), in response to which the AMC 29 sends a credit card number request signal (step d) and an additional service information request signal (step e) to the mobile unit 12. When the mobile unit 12 receives the credit card number request signal, a message "CREDIT CARD NO.?" is displayed on the mobile unit display, prompting the user to enter his credit card number. When the mobile unit 12 receives the additional service information request signal, a message such as "THREE-PARTY COMMUNICATION O/1 X/2" is displayed on the mobile unit display, prompting the user to enter his selection. When the credit card number and the additional service information are entered, these are send from the mobile unit 12 to the AMC 29 via the MBS 26 and MCS 28, and are then passed on to the CAS 20 along with the DN of the mobile unit 12 (step h). The CAS 20 sends a credit check request signal, including the received credit card number, to the credit card database 36 via the CAS terminal 22 and the public network 16, thereby requesting a credit check on the holder of that credit card number (step i). Referring next to FIG. 13B, the result of the credit check done with the credit card database 36 is sent to the CAS 20 via the CAS terminal 22 (step j). If the result of the credit check is OK, the CAS 20 extracts one of the unused permanent IDs stored in the unused permanent ID recorder 52 (FIG. 7) and sends it to the AMC 29 (step k). The AMC 29 sends the ID to the mobile unit 12 via the MCS 28 and MBS 26 (step 1). In the mobile unit 12, the received permanent ID is written to replace the temporary ID (step m); when the writing is complete, a write-complete signal is sent to the AMC 29 (step n). In response to the write-complete. signal, the AMC 29 updates the contents of the HMS 34 (step o) and transmits the write-complete signal to the CAS 20 (step p). In response to the write-complete signal, the CAS 20 updates the contents of the customer information/billing information database 49, and records the disused temporary ID as an unused temporary ID on the unused temporary ID recorder 46 (step g). In the above sequence, by applying scrambling within the communication line established between the mobile unit 12 and the AMC 29, leakage of the ID and other information can be prevented.

As previously noted, the mobile unit 12 does not identify whether the stored ID is a temporary ID or a permanent ID. Therefore, even after the permanent ID is stored in the mobile unit, the same designated DN as used above may be dialled, and by activating the same control program contained in the mobile unit as used in the sequence shown in FIGS. 13A and 13B, the type of additional service that the mobile unit can use may be changed in accordance with a similar sequence.

As described, according to the mobile communication method of the invention, the user who purchases a mobile unit has only to enter the designated telephone number in accordance with the supplied instruction manual and then enter prescribed data in accordance with the display produced on the mobile unit; with this simple procedure, the mobile unit is set ready for use.

In the above-described embodiment, a DN is assigned to each mobile unit prior to shipment from the factory, and the user purchases one of the mobile units with a built-in DN. In such a system, since the DN must be built into each mobile unit before it can be actually sold, there arises a problem in the management of DN numbers. To avoid this, in the second embodiment hereinafter described, each mobile unit is assigned a temporary DN instead of a permanent DN prior to shipment from the factory, and when, at the request of the user who purchased the mobile unit, a permanent ID is written into his unit to replace the preassigned temporary ID, a permanent DN is also written in to replace the preassigned temporary DN, and the disused temporary DN is reserved for future use.

Figure 14:
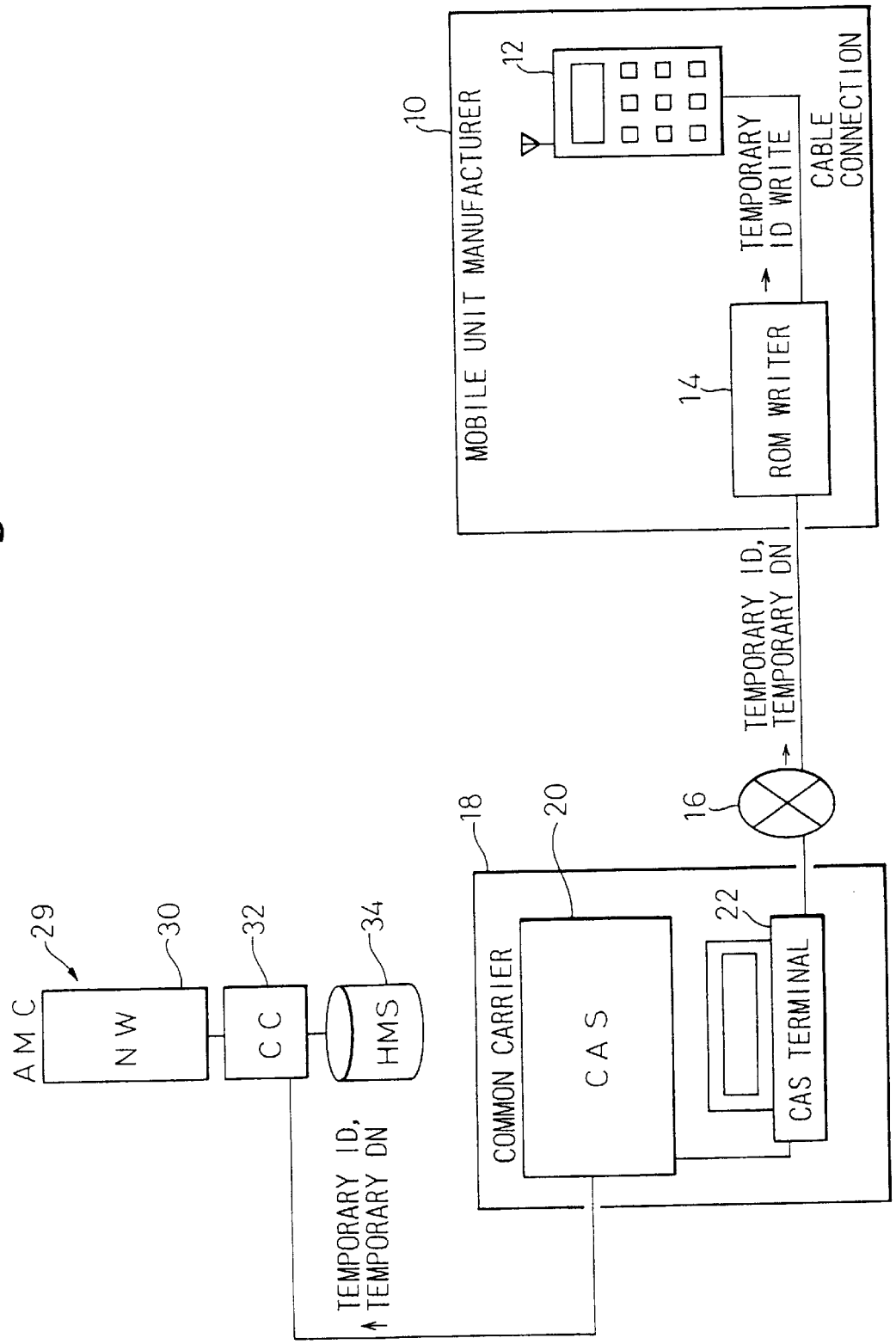
FIG. 14 is a block diagram showing in schematic form a connection setup used when writing a temporary ID according to a second embodiment of the invention.

FIG. 14 shows in schematic form a connection setup used when writing a temporary DN and a temporary ID into the mobile unit in accordance with the second embodiment of the invention. This connection setup is identical to that shown in FIG. 1, except that the DN sent from the CAS 20 upon request from the ROM writer 14 is a temporary DN.

Figure 15:
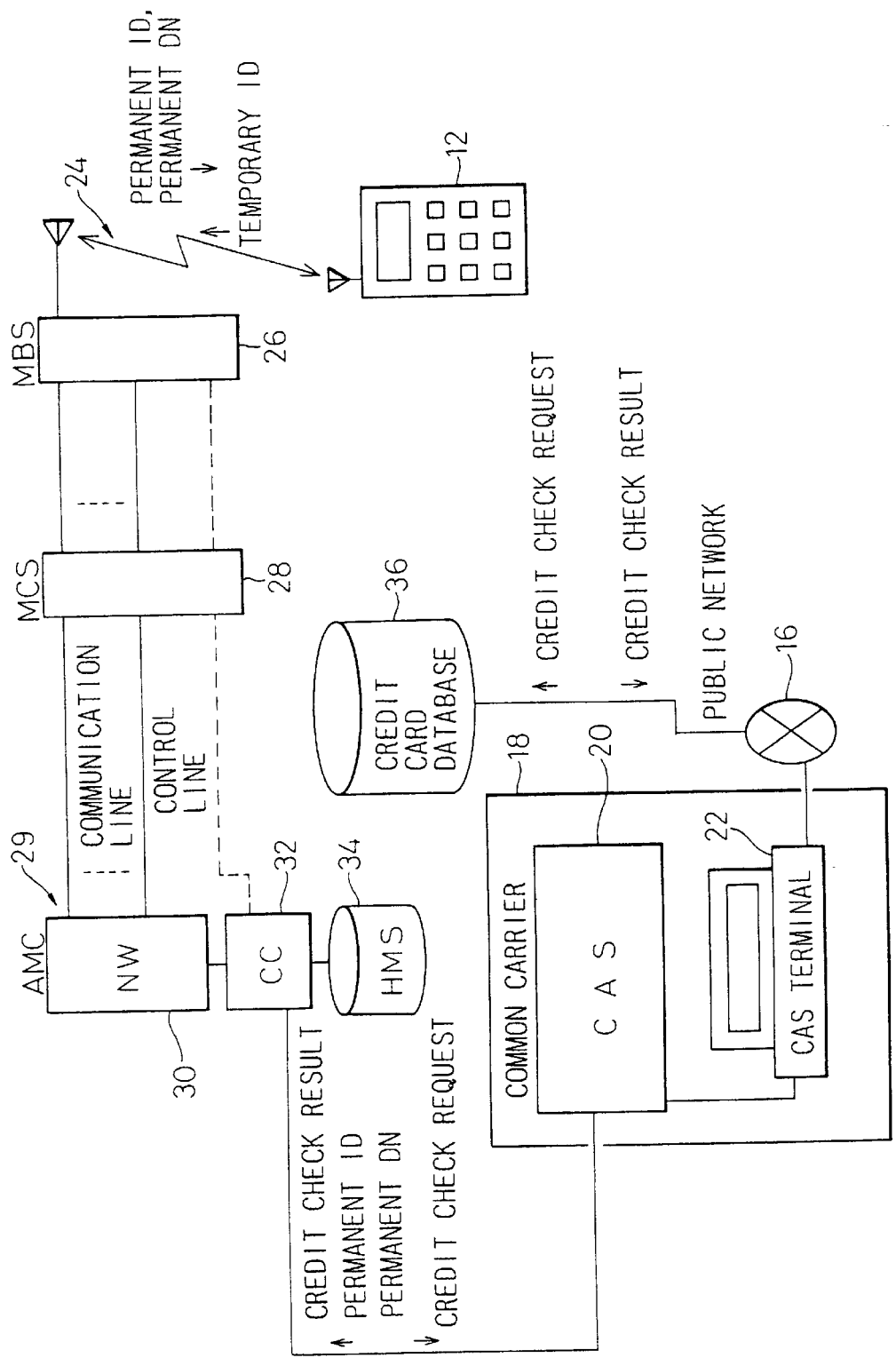
FIG. 15 is a block diagram showing in schematic form a connection setup used when registering a mobile unit according to the second embodiment of the invention.

FIG. 15 shows in schematic form a connection setup used when officially registering the mobile unit with the communication network in accordance with the second embodiment of the invention. This connection setup is identical to that shown in FIG. 3, except that when the result of the credit check is OK, a permanent DN as well as a permanent ID is sent to the mobile unit 12 from the CAS 20 while the same is also stored in the HMS 34.

Figure 16:
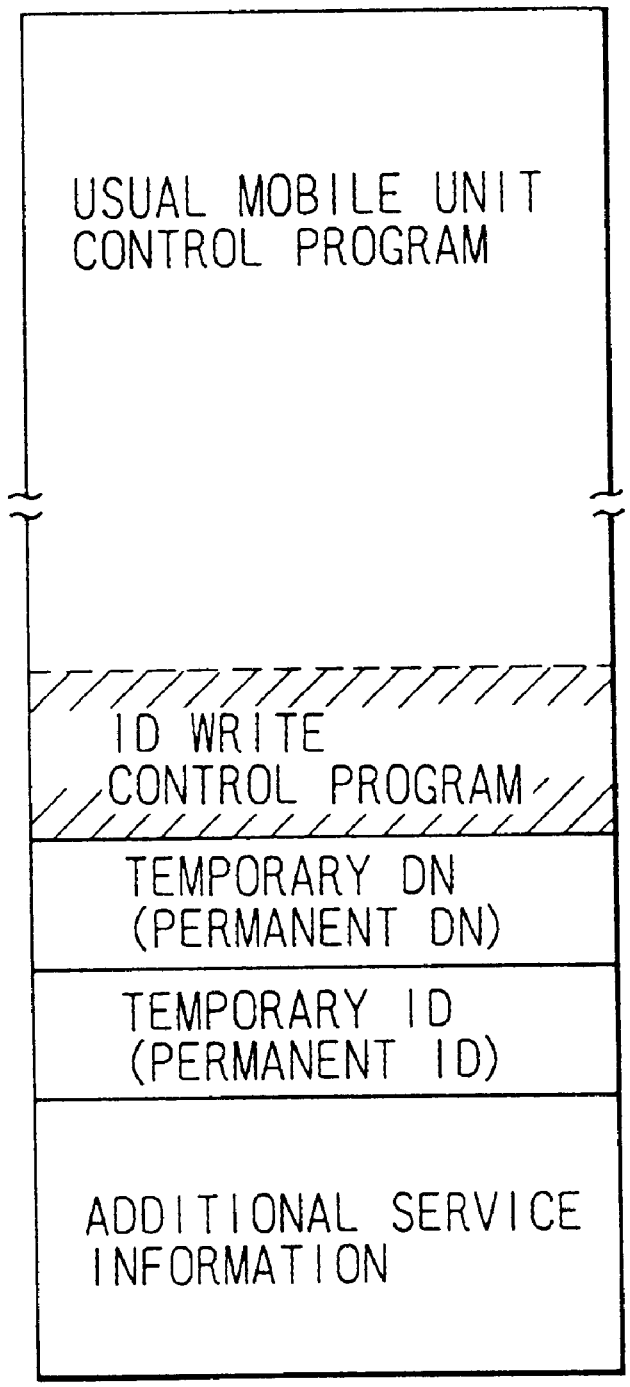
FIG. 16 is a diagram schematically showing the contents of an EEPROM of the mobile unit according to the second embodiment of the invention.

FIG. 16 is a diagram illustrating the contents of the EEPROM of the mobile unit according to the second embodiment of the invention. As in the case of the ID, the permanent DN is stored in the same location where the temporary DN was stored.

FIG. 17 is a diagram showing the configuration of the CAS 20 according to the second embodiment of the invention. In this embodiment, the unused DN recorder 50 shown in FIG. 7 is divided into two parts, an unused temporary DN recorder 84 for recording unused temporary DNs and an unused permanent ON recorder 82 for recording unused permanent DNs.

FIGS. 18A and 18B show a sequence for officially registering the mobile unit in accordance with the second embodiment of the invention. This sequence is identical to that shown in FIGS. 13A and 13B except that in steps k and 1, a new DN is sent in addition to a new ID, in step m, the new DN is written in addition to the new ID, in step o, the DN also is updated, and in step q, the disused temporary DN also is recorded as an unused temporary DN on the unused temporary DN recorder 84.

As described, according to the present invention, since temporary identification information is stored in the mobile unit prior to the sale thereof, communication tests can be performed before shipment and also, registration after the sale can be done by simple operation.

What is claimed is:

1. A customer management system comprising:
   an unused temporary ID recorder for recording unused temporary identification information;
   means for transmitting, in response to a request from a mobile unit manufacturer, particular temporary identification information selected from among the temporary identification information stored in the unused temporary ID recorder, to the requesting mobile unit manufacturer; and means for notifying a mobile telephone switching station of the temporary identification information transmitted by the transmitting means.

2. A customer management system according to claim 1, further comprising an unused temporary DN recorder for recording unused temporary telephone numbers, wherein the transmitting means transmits one of the temporary telephone numbers stored in the unused temporary DN recorder to the mobile unit manufacturer along with the temporary identification information, and the notifying means notifies the temporary telephone number, as well as the temporary identification information, to the mobile telephone switching station.

3. A mobile unit comprising:

an identification information storage for storing identification information;

means for receiving temporary identification information which is unused, said temporary identification information including a temporary telephone number;

means for storing the temporary identification information into the identification information storage;

means for connecting to a customer management system via a mobile communication network by using the identification information stored in the identification information storage; and means for storing permanent identification information, received from the customer management system connected by the connecting means, into the identification information storage.

4. A mobile unit according to claim 3, further comprising means for storing a permanent telephone number received from the customer management system.

* * * * *